(12) United States Patent
Wiemann et al.

(10) Patent No.: US 8,897,149 B2
(45) Date of Patent: Nov. 25, 2014

(54) METHOD AND A TRANSCEIVER FOR HARQ FAILURE DETECTION

(75) Inventors: Henning Wiemann, Aachen (DE); Magnus Lindstrom, Spanga (SE); Michael Meyer, Aachen (DE); Janne Peisa, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 325 days.

(21) Appl. No.: 12/922,902

(22) PCT Filed: Dec. 19, 2008

(86) PCT No.: PCT/SE2008/051521
§ 371 (c)(1),
(2), (4) Date: Sep. 16, 2010

(87) PCT Pub. No.: WO2009/116917
PCT Pub. Date: Sep. 24, 2009

(65) Prior Publication Data
US 2011/0044195 A1    Feb. 24, 2011

Related U.S. Application Data

(60) Provisional application No. 61/037,578, filed on Mar. 18, 2008.

(51) Int. Cl.
*H04L 1/00* (2006.01)
*H04L 1/18* (2006.01)

(52) U.S. Cl.
CPC .............. *H04L 1/1874* (2013.01); *H04L 1/1803* (2013.01); *H04L 1/1812* (2013.01); *H04L 1/1822* (2013.01)
USPC ......... 370/252; 370/235; 455/550.1; 714/748

(58) Field of Classification Search
USPC ................ 370/252, 235; 455/550.1; 714/748
See application file for complete search history.

(56) References Cited

U.S. PATENT DOCUMENTS

| | | | | |
|---|---|---|---|---|
| 6,977,888 B1 * | 12/2005 | Frenger et al. | | 370/218 |
| 7,502,385 B2 * | 3/2009 | Wei et al. | | 370/469 |
| 7,848,279 B2 * | 12/2010 | Ranta-aho et al. | | 370/328 |
| 7,921,347 B2 * | 4/2011 | Kim et al. | | 714/749 |

(Continued)

FOREIGN PATENT DOCUMENTS

| | | |
|---|---|---|
| EP | 2007020318.7 | * 10/2007 |
| WO | 00/57594 | 9/2000 |

OTHER PUBLICATIONS

3GPP Technical Specification 36.321 v1.0.0 (Sep. 2007).*
3GPP ETSI Technical Specification 125 427 v6.5.0 (Dec. 2005).*

(Continued)

*Primary Examiner* — Hassan Kizou
*Assistant Examiner* — Deepa Belur
(74) *Attorney, Agent, or Firm* — Coats and Bennett, PLLC

(57) ABSTRACT

The present invention relates to a method and to a transceiver (400) for detecting HARQ transmission failure in a telecommunications system. The transceiver (400) is arranged to execute a HARQ process which is used to generate a transmission of data units to e.g. a eNodeB. The transceiver is also arranged to determine when a maximum number of transmission attempts is reached and when this occurs to flush a HARQ buffer associated with the HARQ process and to detect that a HARQ transmission failure has occurred when the last HARQ feedback received for the current HARQ process is not a HARQ ACK.

15 Claims, 4 Drawing Sheets

(56) References Cited

U.S. PATENT DOCUMENTS

| | | | |
|---|---|---|---|
| 2006/0252452 A1* | 11/2006 | Umesh et al. | 455/550.1 |
| 2007/0259665 A1* | 11/2007 | Chiu et al. | 455/436 |
| 2008/0109693 A1* | 5/2008 | Maas et al. | 714/748 |
| 2008/0301516 A1* | 12/2008 | Han et al. | 714/748 |
| 2010/0177649 A1* | 7/2010 | Ishii et al. | 370/252 |
| 2010/0325502 A1* | 12/2010 | Lindskog et al. | 714/748 |
| 2010/0329134 A1* | 12/2010 | Doppler et al. | 370/252 |
| 2011/0029834 A1* | 2/2011 | Yang et al. | 714/749 |
| 2011/0176444 A1* | 7/2011 | Nogami | 370/252 |
| 2014/0211770 A1* | 7/2014 | Englund et al. | 370/336 |

OTHER PUBLICATIONS

3RD Generation Partnership Project. "36.321 CR Covering Agreements of RAN2 #61bis and RAN2#62." 3GPP TSG-RAN2 Meeting #62, xR2-082902, Kansas City, US, May 5-9, 2008.

3RD Generation Partnership Project. ETSI TS 136 300, V8.3.0 (Jan. 2008). Universal Mobile Telecommunications Systems (UMTS); Evolved Universal Terrestrial Radio Access (E-UTRA) and Evolved Universal Terrestrial Radio Access (E-UTRAN); Overall description; Stage 2 (3GPP TS 36.300 version 8.3.0 Release 8). Jan. 2008.

3RD Generation Partnership Project. 3GPP TS 36.321, V8.0.0 (Dec. 2007). 3rd Generation Partnership Project; Technical Specification Group Radio Access Network; Evolved Universal Terrestrial Radio Access (E-UTRA) Medium Access Control (MAC) protocol specification (Release 8). Dec. 2007.

3RD Generation Partnership Project. 3GPP TS 36.321, V8.1.0 (Mar. 2008). 3rd Generation Partnership Project; Technical Specification Group Radio Access Network; Evolved Universal Terrestrial Radio Access (E-UTRA) Medium Access Control (MAC) protocol specification (Release 8). Mar. 2008.

* cited by examiner

METHOD AND A TRANSCEIVER FOR HARQ FAILURE DETECTION

TECHNICAL FIELD

The present invention relates generally to the field of wireless telecommunications, and error control techniques, and more particularly, to a method and a transceiver for detecting hybrid automatic repeat request (HARQ) failure in a wireless telecommunications system.

BACKGROUND

The 3rd Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach a data rates of about 100 Mbps on the downlink and about 50 Mbps on the uplink.

The 3GPP LTE system will include protocols intended to minimize the loss of data transmitted through the radio link between entities in the network. One of these protocols is known as the radio link control (RLC) protocol used for communication between user equipments in a cell and a controlling node or nodes, e.g. a radio base station(s) of the cell. In LTE, a base station is also known as eNB (enhanced/evolved NodeB) or eNodeB which performs the functions of a conventional radio access network (RNC) node of a UMTS Node B. In addition, eNBs in LTE will interact directly with the core network and with other eNBs.

The 3GPP LTE system will also include a LTE medium access control (MAC) protocol specifying means for a transceiver (or entity), e.g. a transmitter, to notify higher layers of a transmission failure. In order to provide notifications of transmission failures, the MAC layer in LTE comprises a so called Multi-Process Stop-And-Wait HARQ protocol and in accordance with this protocol, a HARQ entity, e.g. in a receiver, is configured to send a positive or a negative feedback at a predefined time in response to each transmission attempt. A positive feedback is also known as an acknowledgement (ACK) whereas a negative feedback is known as a non-(or negative) ACK (NACK). HARQ is therefore generally used for facilitating fast error detection and correction. As an example, a uplink HARQ transmitter interprets a received HARQ NACK as implicit grant allowing the transmitter to perform a retransmission at a predefined time. The feature of notifying higher layers of transmission failure(s) is also referred to as local-NACK since it enables higher layer protocols to trigger a retransmission without relying on higher layer timers or other triggers. This detection mechanism takes into account the HARQ feedback (ACK/NACK) provided by a HARQ receiver to a HARQ transmitter.

According to the prior art 3GPP technical specification TS 36.321, v8.1.0, it is mandatory for the MAC layer to inform a radio resource control (RRC) function (or layer) in the transmitter about a failed HARQ transmission when the HARQ process contained data that are mapped to a common control channel (CCCH). A CCCH is a channel that supports common procedures required to establish a dedicated link with a network. In case data is not mapped to CCCH, the above mentioned specification describes that the HARQ transmitter can be configured to inform the RLC automatic repeat request (ARQ) about said HARQ transmission failure. The prior art specifications thus deals differently with a notification of a HARQ transmission failure depending on whether data is mapped on the CCCH or not. Furthermore, the technical specification defines a method allowing a base station (i.e. eNB or eNodeB or NodeB) to temporarily suspend a planned upcoming transmission from a user equipment (UE). For that purpose, the eNodeB can be configured to send a positive HARQ ACK even though said eNodeB was not able to correctly receive or correctly decode the corresponding HARQ process that is associated with the HARQ ACK. By sending the HARQ ACK, the eNodeB temporarily indicates to the UE that the transmission was successful although it was not. However, after a predefined time duration or after a so called HARQ round-trip-time (RTT) duration, the eNodeB may then issue an uplink grant (for re-transmission) in order to allow the UE to resume the transmission cycle of the suspended cycle. The eNodeB is configured to suspend uplink transmissions in order to e.g. reduce the probability that a retransmission from the UE collides with a transmission attempt from another UE. In other words, it is considered important for a eNodeB to be able to suspend transmissions since the occurrence of a collision is likely to result in a loss of the packets or signals transmitted from UEs involved in the collision.

In the above mentioned technical specification, the local NACK mechanism used to deal with detection of a transmission failure is also known as the HARQ process. The prior art HARQ process described is configured to mainly base it decision on the HARQ failure detection if:
(a) a predetermined maximum number of allowed transmissions has been performed for this process and
(b) no HARQ ACK is received for this process.

A drawback with the solution described above is that the HARQ process cannot guarantee a proper/correct detection of a HARQ transmission failure. This is the case, for example, if the HARQ receiver in the eNodeB decides to (temporarily) suspend an uplink transmission from a UE by sending it a positive HARQ ACK for suspension, even though the eNodeB was not able to decode or receive the HARQ process correctly. Thus since the HARQ ACK for suspension has been sent to the UE, the failure detection mechanism (e.g. the local NACK) as currently defined (see above) will interpret a suspended HARQ process as successfully completed. This will therefore cause, in addition to an improper functioning of the HARQ process also an improper utilization of the UE buffer leading to an unnecessary increase in data latency. Note that this is true even if, as explained earlier, the eNodeB resumes (or restarts) the HARQ process due to suspension by sending a HARQ NACK in a following predefined time interval.

SUMMARY

It is thus an object of the exemplary embodiments of the present invention to address the above mentioned problems and to provide a method and an apparatus corresponding to a transceiver that properly and successfully handle the detection of a HARQ failure transmission even in the case suspension of transmissions occur.

According to a first aspect of embodiments of the present invention, the above stated problem is solved by means of a method of detecting a HARQ transmission failure in a transceiver of a telecommunications system wherein data units (e.g. protocol data units (PDU) and/or service data units (SDU)) are exchangeable between the transceiver and another transceiver. The method comprises the steps of: executing a HARQ process used to generate a transmission of at least one data unit to the other transceiver; determining when a maximum number of allowed transmissions is reached; flushing a HARQ buffer that is associated with the HARQ process when the maximum number of transmissions is reached; receiving at least one HARQ feedback from the other transceiver, and detecting that a HARQ transmission failure has occurred when the last HARQ feedback received from the other transceiver for the current HARQ process differs from a HARQ ACK. Thus, when the last HARQ feedback for the HARQ process under consideration is e.g. a HARQ NACK or any other type HARQ feedback that is different from a proper (or valid) HARQ ACK, then a HARQ transmission failure is detected and at least one or several upper layers are notified of the same.

According to a second aspect of embodiments of the present invention, the above stated problem is solved by means of a transceiver for detecting a HARQ transmission failure in a telecommunications system wherein PDUs are exchangeable between the transceiver and another transceiver. According to the embodiments of the present invention, the transceiver is configured to execute a HARQ process used to generate a transmission of at least one data unit (e.g. PDU or SDU) to the other transceiver. The transceiver is further configured to determine when a maximum number of allowed transmissions is reached and to flush a HARQ buffer that is associated with the HARQ process when the maximum number of transmissions is reached. The transceiver is further arranged to receive at least one HARQ feedback from the other transceiver. The transceiver is further arranged to detect that a HARQ transmission failure has occurred when the last HARQ feedback received from the other transceiver for the current HARQ process differs from a HARQ ACK. If e.g. the last HARQ feedback is a NACK or differs from a proper ACK, the transceiver is configured to determine that a transmission failure has occurred and to notify at least the upper layers of the failure. An advantage with the present invention is thus to properly and correctly detect HARQ transmission failures in a network even if a suspension in transmission(s) occurs in the network.

Another advantage with the present invention is that the data latency related to buffers of the transceiver(s) is/are not unnecessarily increased due to HARQ transmission failure(s).

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a e.g. MAC protocol comprising a HARQ protocol in a communications network based on the third generation (3G) long term evolution (LTE) concept. It should be noted that the present invention is not restricted to 3G LTE but can be applicable in other wireless systems that employ MAC and HARQ protocols used to detect transmission failures, such as WiMAX (worldwide interoperability for microwave access), or HSPA (high speed packet access) or HSUPA (high speed uplink packet access) or HSDPA (high speed downlink packet access) or WCDMA (wideband code division multiple access) etc.

Figure 1:
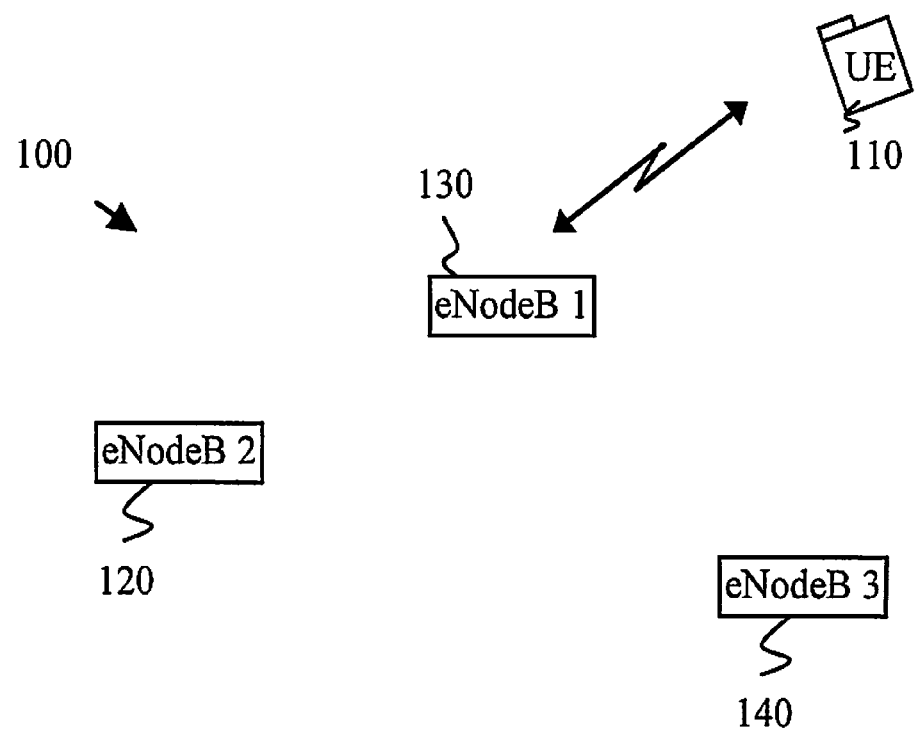
FIG. 1 is a diagram illustrating an example of a wireless network system wherein exemplary embodiments of the present invention can be applied.

Referring to FIG. 1, there is illustrated a block diagram of an exemplary wireless telecommunications network system 100 in which the different exemplary embodiment of the present invention may be applied. Note that the system depicted in FIG. 1 only shows transceivers or nodes that are necessary for understanding the different exemplary embodiments of the present invention. As shown, the system 100 which is here considered to represent a simplified 3GPP LTE system, comprises a transceiver 110 acting as a user equipment (UE) and other transceivers acting as radio base stations and denoted eNodeB 1 130, eNodeB 2, 120 and eNodeB 3 140. One of the functions of the eNodeB is to control traffic to and from UEs in a cell. The UE 110 is suitable to be used as a mobile phone, a wireless terminal, a laptop, a personal computer, a personal digital assistant, a voice over internet protocol (VoIP) capable phone or any other 3GPP LTE capable equipment. Traffic between a eNodeB and the UE 110 is referred to as downlink (DL) traffic and traffic between the UE 110 and a eNodeB is referred to as uplink (UL) traffic. Note that in FIG. 1, the UE 110 is assumed to be served by eNodeB 1 130 although any one of the other eNodeBs 120, 140 may serve the UE 110.

Figure 2:
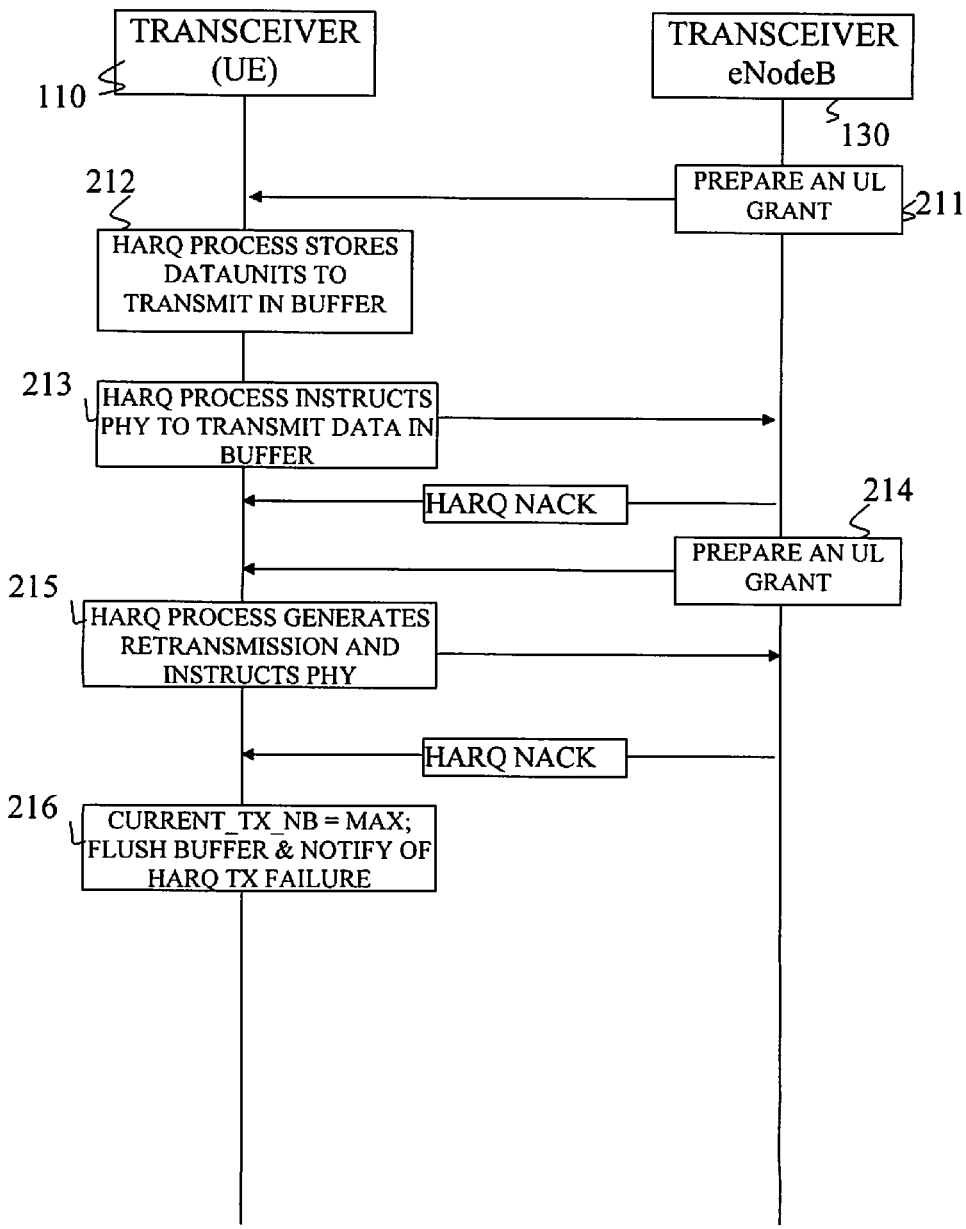
FIG. 2 is a flow diagram of the principals of HARQ according to the general state of the art.

As mentioned earlier, in LTE, the MAC protocol comprises the HARQ protocol, or, in other words, HARQ is implemented as a MAC module also known as a HARQ entity. The level or layer of the MAC used to implement HARQ is level 1 (or layer 1). The HARQ entity is present at a UE and one or several HARQ entities are present at the eNodeB. The HARQ entity in e.g. the UE is associated with several generally, parallel processes e.g. N processes, in order to implement N stop and wait HARQ protocol and to allow transmissions to take place while waiting for the feedback on the successful or unsuccessful reception of previous transmissions. The number N of processes is a design parameter and therefore, the embodiments of the present invention are not restricted to any number of HARQ processes or any number of HARQ entities to be used. It should be noted that the exemplary scenario described and shown in conjunction with FIG. 2 is a prior art HARQ procedure in the uplink (UL). As shown, the eNodeB 130 prepares in 211 an UL grant for enabling the UE 110 to send data units. The UL grant is sent on a control channel to the UE 110. As known in the art, the UL grant may indicate control information such as the HARQ process to be used which can be indicated by a HARQ process identification number (ID). The UL grant may also indicate a type of transmission (new transmission or a retransmission)

Generally, each HARQ process is associated with a HARQ buffer. Therefore, when a data unit (PDU or SDU) is intended to be transmitted, the HARQ process is configured to generate a transmission by storing the PDU or the SDU in its HARQ buffer and further instructs e.g. the physical layer of the transmitter (e.g. UE or eNodeB) to transmit the data. It should be noted that the HARQ entity defined receives a PDU or SDU for transmission from one or several modules of the transmitter.

Each HARQ process is also configured to maintain a so called state variable indicating the maximum number of transmissions that have taken place for the data unit (e.g. MAC PDU or RLC PDU or MAC SDU) currently in the HARQ buffer. The state variable is defined in the 3GPP specification mentioned earlier, and is denoted CURRENT_TX_NB. This state variable CURRENT_TX_NB is initialized to zero when a HARQ process is established or is to be executed in order to perform a transmission. Thus, if a HARQ entity requests a new transmission, the HARQ process sets CURRENT_TX_NB to zero and stores the PDU or SDU in the HARQ buffer prior to generating a transmission by means of the HARQ process. If, on the other hand, the HARQ entity requests a retransmission of the PDU or SDU due to e.g. a reception of a NACK, the HARQ process is configured to increment the state variable CURRENT_TX_NB by one.

Before describing and illustrating the different exemplary embodiments of the present invention, the principals of HARQ according to prior art, are described and illustrated in conjunction with said FIG. 2.

Referring again to FIG. 2, there is illustrated an exemplary network scenario wherein the UE is represented by transceiver 110 which here is considered acting as the transmitter. The eNodeB is represented by transceiver 130 acting as a receiver. In FIG. 2, it is shown signals communicated between the UE 110 and the eNodeB 130 and functions performed by UE 110 and eNodeB 130 when HARQ is used. It should be noted that the exemplary scenario shown in FIG. 2 is generally known as HARQ in uplink (UL). Furthermore and for better understanding the principals of HARQ, not all signals or functions are illustrated. The description below better reflects the prior art principals of HARQ:

As depicted, the eNodeB 130 starts preparing an UL grant (in block 211) for the UE 110 and sends on a control channel said UL grant. The grant may indicate control information such as e.g. a HARQ process identification number (ID) to be used. The UL grant may also indicate the type of transmission i.e. if it is a new transmission or if it is a retransmission. The UL grant may also indicate other information such as a so called redundancy version. When the UE 110 receives the UL grant, the HARQ entity of the UE informs one or several modules in the UE 110 about the transmission opportunity. If e.g. there is pending data unit(s) (e.g. MAC PDU, MAC SDU, RLC PDU etc.) for transmission the HARQ entity receives a data unit from said one or several modules. The HARQ entity then instructs the HARQ process which was indicated by the ID in the UL grant to execute the transmission of the data. The HARQ process is configured to store the received data (from said module) in its HARQ buffer. This is indicated in FIG. 2 in block 212. The HARQ process is also configured to set the redundancy version to a value indicated in the UL grant i.e. in the control information received from the eNodeB 130. Thereafter the HARQ process in the UE 110 instructs (in block 213) the physical layer (PHY) of the UE 110 to transmit (TX) the data in the buffer.

As mentioned earlier, the receiver (in this case the eNodeB 130) can send a HARQ feedback in the form of a ACK if it received the data that was transmitted from the UE 110 and if it correctly decoded the data. The eNodeB 130 can also send a HARQ feedback in the form of a NACK to the UE 110 if failure to decode or receive the data. In FIG. 2 it is illustrated the case where the transmitted data (or data block) could not be successfully decoded (or received) at the eNodeB 130 and therefore a NACK is assumed received by UE 110 from eNodeB 130. The eNodeB 130 prepares (block 214) and sends a new UL grant to the UE 110 requesting it for a retransmission of the data. In such an event, the HARQ process (in block 215) in the UE 110 starts to generate a retransmission and instructs the PHY to retransmit (re_TX) the buffer contents as per the redundancy version instructed by the eNodeB 130 in control information included in the newly received UL grant. Let us now assume that the previously mentioned state variable CURRENT_TX_NB is set to a maximum of two transmission, i.e. CURRENT_TX_NB=2. In this exemplary scenario, the PHY of the UE 110 re-transmits one more time (as illustrated) the data to the eNodeB 130. Note that CURRENT_TX_NB is not necessarily equal to 2. It actually depends on the type of quality of service that is defined in the network. As an example, if real time traffic is used the state variable should be low (equal to e.g. 1 or 2). But if a large amount of data (e.g. a document or file transfer) is to be send then a larger value of the state variable should be used.

Referring back to FIG. 2 and according to the prior art, if the CURRENT_TX_NB reaches the maximum number (assumed here equal to 2) without getting an ACK, due to that the eNodeB 130 did not successfully receive or decode the data, the HARQ process in the UE 110 may flush the HARQ buffer (i.e. delete data in the buffer) and notifies higher layer(s) or entities in the UE 110 that the transmission of the corresponding data (i.e. MAC PDU, MAC SDU, RLC PDU etc.) failed. This is indicated in block 216. It should be noted that if the data unit(s) transmitted where mapped to a common control channel (CCCH) (which is a channel that supports common procedures required to establish a dedicated link with a network), then the RRC layer (function) may be notified of the transmission failure of the corresponding data (e.g. MAC SDU). If, on the other hand the data transmitted was not mapped to CCCH, then the relevant ARQ (automatic repeat request) entities in the upper layer are notified that the transmission of the correspondence data (e.g. RLC PDUs) failed.

A drawback with the prior art solution described in conjunction with FIG. 2, is that if the eNodeB 130 decides to suspend (temporarily) the UL transmission from the UE 110, the eNodeB 130 sends an HARQ ACK for suspension, even though the eNodeB 130 did not correctly received the HARQ process correctly. In this case, the UE 110 interprets the HARQ ACK for suspension as a successful transmission, which actually is not. Note that even if the eNodeB 130 resumes the process by sending a HARQ NACK in a following time interval, the process of UE 110 did not operate properly due to suspension from the eNodeB 130, and thus the so called local NACK mechanism did not work after suspension since, again, a HARQ ACK has, in fact been received by the UE 110 for the process under consideration. The buffer of the UE 110 has therefore been improperly used causing an unnecessary increase in data latency. The following exemplary embodiment of the present invention will describe how to overcome the above described disadvantage of the prior art solution.

According to an exemplary embodiment of the present invention, detection of HARQ failure in a transceiver (e.g. UE) is performed according to the following:

The HARQ process in the UE, upon having received an UL grant from a eNodeB, is executed in order to generate a transmission of data unit(s) stored in the buffer associated with the HARQ process. When the maximum number (i.e. CURRENT_TX_NB) of allowed transmission attempts is reached, the HARQ buffer is flushed and it is determined in the UE when the last HARQ feedback received from the eNodeB for the current process differs from a HARQ ACK (i.e. it is an improper ACK or a NACK), then it is decided in the UE that a HARQ transmission failure is detected if the HARQ feedback differs from ACK. Following that, one or several entities and/or higher layers are notified or informed of the transmission failure. According to an embodiment of the present invention, if the HARQ process used to generate the transmission of data unit(s) (e.g. MAC SDU) that is mapped to a common control channel (CCCH) then the HARQ transmission failure of the data unit(s) (e.g. MAC SDU) is notified to a radio resource control (RRC) function (entity) at the UE.

According to another embodiment of the present invention, if the data unit(s) was/were radio link control (RLC) PDU(s) then the HARQ transmission failure of the data unit(s) (RLC PDUs) is notified to the relevant ARQ entities in the upper layer.

Note that the above described HARQ process of detecting a HARQ transmission failure in accordance with the present invention, properly handles the case where the UE receives a HARQ ACK for suspension from the eNodeB. This is because it is the last (most recent) HARQ feedback received for this process that is taken into consideration when deciding that a HARQ transmission failure is detected or not. Note also that even if the eNodeB resumes (or restarts) the HARQ process due to the suspension by sending e.g. a HARQ NACK, the UE do correctly detect a HARQ transmission failure because in this case it is the HARQ NACK that is the last one received at the UE for this HARQ process. An advantage achieved by the process described above is that the buffer of the UE is properly used and unnecessary increase in data latency is avoided.

Figure 3:
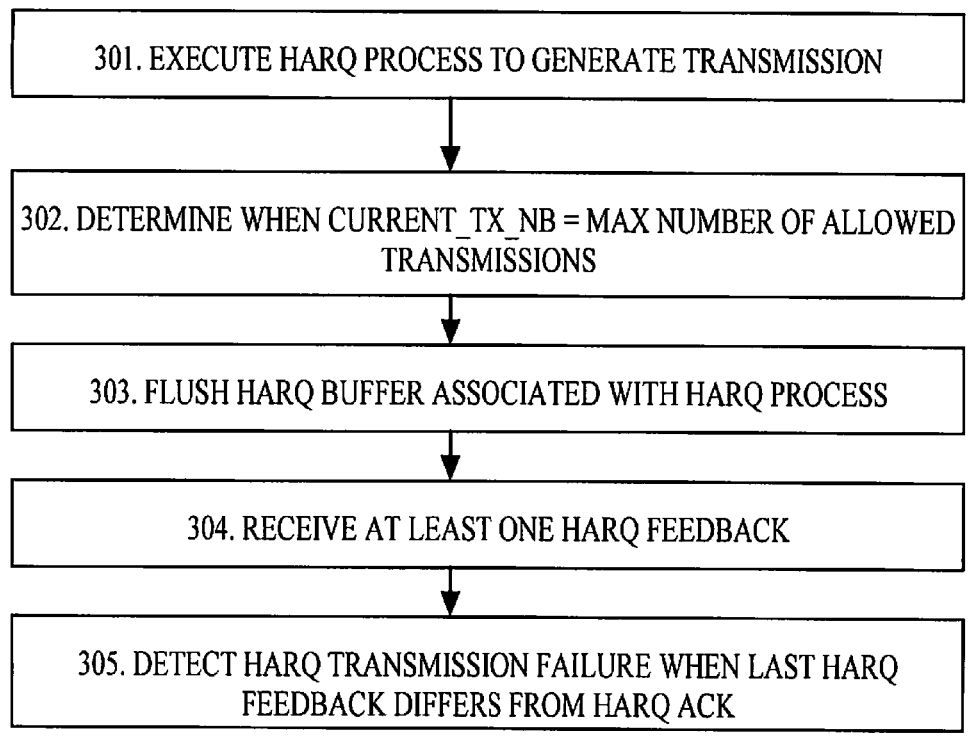
FIG. 3 is a diagram illustrating a flowchart of a method according to exemplary embodiments of the present invention.

Referring to FIG. 3 there is illustrated a flowchart of a method of detecting HARQ transmission failure, in accordance with the above described embodiments of the present invention. The method comprises the following main steps performed by a transceiver (e.g. UE) capable in exchanging data units (e.g. PDUs and/or SDUs) with one or several transceivers (e.g. eNodeB):

(301) executing a HARQ process which is used to generate a transmission of at least one data unit (SDU and/or PDU) to the other transceiver (eNodeB);

(302) determining when a maximum number of allowed transmissions is reached, i.e. when CURRENT_NB_TX reaches its maximum number;

(302) flushing a HARQ buffer that is associated with the HARQ process when the number of allowed transmissions is reached;

(304) receiving at least one HARQ feedback from the other transceiver (eNodeB); and (305) detecting that a HARQ transmission failure has occurred when the last HARQ feedback received from the other transceiver for the current HARQ process differs from a HARQ ACK (i.e. it is not a proper ACK or it is a NACK).

As mentioned earlier, when the transmission corresponds to data unit(s) that is mapped to a CCCH, then it is the RRC function at the UE that is notified of a failure in the HARQ transmission of a MAC SDU corresponding to the CCCH.

When a RLC PDU transmission failure occurs and is detected, in according to with the above described embodiments of the present invention, the relevant ARQ entities in the upper layer at the UE, is/are notified of the transmission failure of the corresponding RLC PDU(s).

Figure 4:
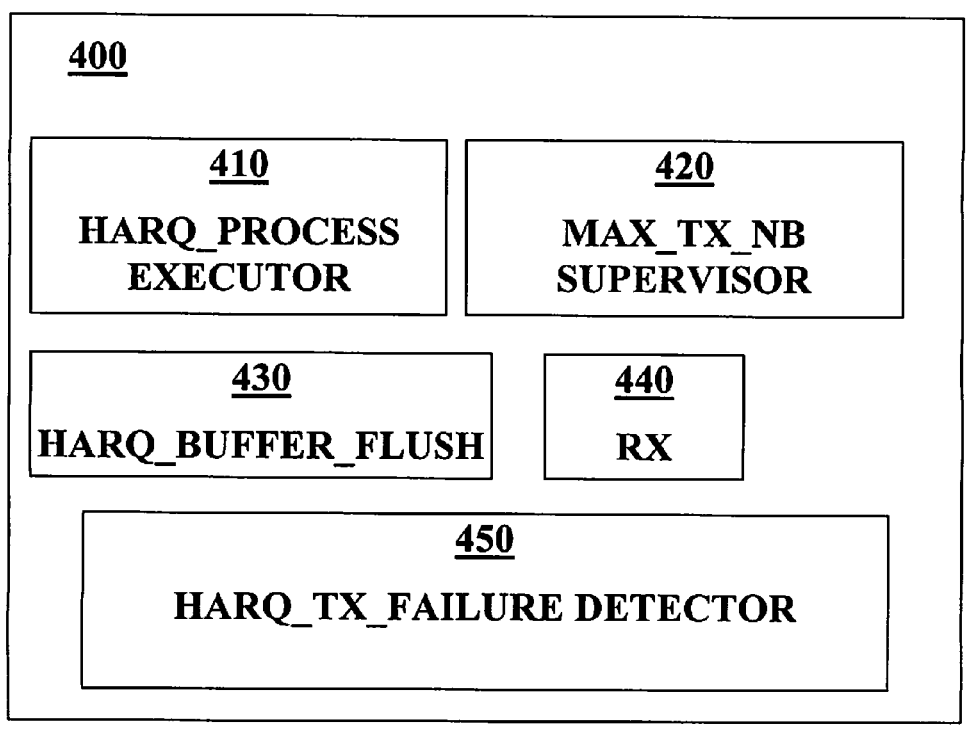
FIG. 4 illustrates a block diagram of an exemplary transceiver according to embodiments of the present invention.

Referring to FIG. 4 there is illustrated a block diagram of an exemplary transceiver acting as a UE and being configured to perform at least the main steps and the additional steps presented above. As shown, transceiver 400 comprises means 410 configured to execute a HARQ process (HARQ process executor) which is used to generate a transmission of at least one data unit (SDU and/or PDU) to other transceiver (eNodeB) (not shown). The transceiver 400 further comprises means 420 configured to determine when a maximum number of transmission attempts has been reached. Means 420 is denoted MAX_TX_NB supervisor in FIG. 4. The transceiver 400 further comprises means 430 configured to flush a HARQ buffer that is associated with the HARQ process, when the maximum number of allowed transmissions is reached. Means 430 is denoted HARQ_buffer_flush in FIG. 430. The transceiver 400 further comprises means 440 (RX) to receive at least one HARQ feedback from the eNodeB. The transceiver 400 further comprises means 450 (HARQ_TX_failure detector) configured to detect a HARQ failure transmission when the last HARQ feedback received from the other transceiver (eNodeB), for the current HARQ process, differs from a HARQ ACK (i.e. it is a HARQ NACK or an invalid HARQACK). Not that transceiver 400 may further include other means not illustrated or discussed above. Furthermore, transceiver 400 is also arranged to notify (internally) the RRC function and/or the ARQ entities of the HARQ transmission failure as previously described. Note that the HARQ entity in the transceiver 400 is configured to implement a multi-process stop-and-wait HARQ protocol. Note that the different blocks as schematically shown in FIG. 4 can be comprised in one and the same block and are therefore not necessarily separated.

The present invention and its embodiments can be realised in many ways. For example, one embodiment of the present invention includes a computer-readable medium having instructions stored thereon that are executable by a transceiver of a telecommunications system, acting as a user equipment. The instructions executable by the transceiver and stored on a computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method of detecting a hybrid automatic repeat request (HARQ) transmission failure in a transceiver of a telecommunications system wherein data units are exchanged between the transceiver and another transceiver, said method comprising the steps of:
    executing a HARQ process used to generate a transmission of at least one data unit to the other transceiver;
    determining when a maximum number of allowed transmissions is reached;
    flushing a HARQ buffer associated with the HARQ process when the maximum number of allowed transmissions is reached;
    receiving an ACK feedback from the other transceiver; and
    detecting that a HARQ transmission failure has occurred despite the ACK feedback received from the other transceiver when the last HARQ feedback received from the other transceiver for the current HARQ process differs from a HARQ acknowledgment (ACK).

2. The method according to claim 1, wherein the last HARQ feedback received corresponds to the HARQ feedback received for the last transmission of the HARQ process.

3. The method according to claim 1, wherein executing the HARQ process comprises generating a transmission of at least one data unit mapped to a common control channel (CCCH).

4. The method according to claim 3, further comprising, upon detecting the HARQ transmission failure, notifying a radio resource control (RRC) function of said transceiver that the transmission of a medium access control (MAC) service data unit (SDU) corresponding to the CCCH has failed.

5. The method according to claim 1, further comprises upon detecting the HARQ transmission failure, notifying at least one automatic repeat request (ARQ) entity in an upper layer of the transceiver, that the transmission of a radio link control (RLC) protocol data unit (PDU) corresponding to said at least one data unit has failed.

6. The method according to claim 1, wherein detecting that the HARQ transmission failure has occurred comprises detecting the HARQ transmission failure when the last HARQ feedback is a HARQ NACK.

7. A transceiver for detecting a hybrid automatic repeat request (HARQ) transmission failure in a telecommunications system wherein data units are exchanged between the transceiver and another transceiver, said transceiver is configured to:
   execute a HARQ process to generate a transmission of at least one data unit to the other transceiver;
   determine when a maximum number of allowed transmissions is reached;
   flush a HARQ buffer associated with the HARQ process when the maximum number of allowed transmissions is reached;
   receive an ACK feedback from the other transceiver; and
   detect that a HARQ transmission failure has occurred despite the ACK feedback received from the other receiver when the last HARQ feedback received from the other transceiver for the current HARQ process differs from a HARQ acknowledgement (ACK).

8. The transceiver according to claim 7, wherein the last HARQ feedback received corresponds to the HARQ feedback received for the last transmission of the HARQ process.

9. The transceiver according to claim 7, wherein the transceiver is further configured to generate a transmission of at least one data unit mapped to a common control channel (CCCH).

10. The transceiver according to claim 9, wherein the transceiver is further configured, upon detecting the HARQ failure transmission, to notify a radio resource control (RRC) function of the transceiver that the transmission of a medium access control (MAC) service data unit (SDU) corresponding to the CCCH has failed.

11. The transceiver according to claim 7, wherein the transceiver is configured, upon detecting said HARQ failure transmission, to notify at least one automatic repeat request (ARQ) entity in a upper layer of the transceiver that the transmission of a radio link control (RLC) protocol data unit (PDU) corresponding to said at least one transmitted data unit has failed.

12. The transceiver according to claim 7, wherein the transceiver is configured to detect the HARQ transmission failure when the last HARQ feedback is an HARQ NACK.

13. The transceiver according to claim 7, wherein the transceiver is a user equipment.

14. The transceiver according claim 7, wherein the transceiver is a radio base equipment or an evolved Node B (eNB).

15. The transceiver according to claim 7, wherein the transceiver is a Long Term Evolution (LTE) transceiver, and wherein said transceiver includes a HARQ entity implementing a multi-process stop-and-wait HARQ protocol.

\* \* \* \* \*